(12) United States Patent
Fricke et al.

(10) Patent No.: US 9,505,900 B2
(45) Date of Patent: Nov. 29, 2016

(54) METHOD FOR PRODUCING XEROGEL COMPOSITES

(75) Inventors: Marc Fricke, Osnabrück (DE); Volker Schädler, Ann Arbor, MI (US); Thomas Breiner, Laudenbach (DE); Antoni Sánchez-Ferrer, Zürich (CH); Francois-Xavier Simon, Levallois-Perret (FR); Daniel Schmidt, Tewksbury, MA (US)

(73) Assignee: BASF SE, Ludwigshafen (DE)

( * ) Notice: Subject to any disclaimer, the term of this patent is extended or adjusted under 35 U.S.C. 154(b) by 501 days.

(21) Appl. No.: 13/256,905

(22) PCT Filed: Mar. 12, 2010

(86) PCT No.: PCT/EP2010/053193
§ 371 (c)(1),
(2), (4) Date: Sep. 15, 2011

(87) PCT Pub. No.: WO2010/105985
PCT Pub. Date: Sep. 23, 2010

(65) Prior Publication Data
US 2012/0007012 A1    Jan. 12, 2012

(30) Foreign Application Priority Data
Mar. 16, 2009  (EP) ..................................... 09155261

(51) Int. Cl.
C08J 9/40   (2006.01)
C08G 18/32  (2006.01)
C08L 75/04  (2006.01)
C08G 101/00 (2006.01)

(52) U.S. Cl.
CPC ............ C08J 9/405 (2013.01); C08G 18/3243 (2013.01); C08L 75/04 (2013.01); C08G 2101/0091 (2013.01); C08G 2330/50 (2013.01); C08J 2205/02 (2013.01); C08J 2361/28 (2013.01); C08J 2475/00 (2013.01)

(58) Field of Classification Search
CPC .......................... C08J 2205/05; C08G 18/3243
USPC ......................................................... 521/134
See application file for complete search history.

(56) References Cited

U.S. PATENT DOCUMENTS

| | | |
|---|---|---|
| 4,334,971 A | 6/1982 | Mahnke et al. |
| 4,966,919 A * | 10/1990 | Williams et al. ............... 521/54 |
| 5,478,867 A | 12/1995 | Tabor |
| 5,536,370 A | 7/1996 | Scherr et al. |
| 5,565,142 A * | 10/1996 | Deshpande et al. ............ 252/62 |
| 5,948,482 A * | 9/1999 | Brinker et al. .................. 516/33 |
| 2006/0029857 A1* | 2/2006 | Cherepy et al. ................ 429/40 |
| 2006/0211840 A1* | 9/2006 | Lee ..................... C08G 18/5024 528/68 |
| 2007/0259979 A1* | 11/2007 | Lee ..................... C08G 18/5024 521/64 |
| 2009/0283480 A1* | 11/2009 | Schadler et al. .............. 210/767 |
| 2010/0148109 A1* | 6/2010 | Schadler et al. ................ 252/62 |
| 2012/0022179 A1 | 1/2012 | Emge et al. |
| 2012/0193286 A1* | 8/2012 | Prissok et al. ............. 210/510.1 |

FOREIGN PATENT DOCUMENTS

| | | |
|---|---|---|
| DE | 10 2007 009127 A1 | 9/2007 |
| EP | 37 470 A1 | 10/1981 |
| EP | 0 071 672 A1 | 2/1983 |
| WO | WO-94/12560 A1 | 6/1994 |
| WO | WO-00/24799 A1 | 5/2000 |
| WO | WO-2007/146945 A2 | 12/2007 |
| WO | WO 2007147730 A1 * | 12/2007 |
| WO | WO 2008/138977 A1 | 11/2008 |
| WO | WO-2008/138978 A1 | 11/2008 |
| WO | WO-2009/027310 A1 | 3/2009 |
| WO | WO 2010/084058 A1 | 7/2010 |

OTHER PUBLICATIONS

U.S. Appl. No. 13/381,231, filed Dec. 28, 2011, Fricke, et al.
U.S. Appl. No. 13/403,530, filed Feb. 23, 2012, Fricke, et al.

* cited by examiner

*Primary Examiner* — Mike M Dollinger
(74) *Attorney, Agent, or Firm* — Oblon, McClelland, Maier & Neustadt, L.L.P.

(57) ABSTRACT

The invention relates to a process for producing xerogel composites, which comprises: (a) provision of a composition comprising an organic gel precursor (A) comprising a monomer component (A1) composed of at least one polyfunctional isocyanate and a monomer component (A2) composed of at least one compound selected from among polyfunctional amines and polyfunctional hydroxy compounds; (b) reaction of the gel precursor (A) in the presence of an open-celled macroporous foam (B) and a solvent (C) to form a xerogel composite; (c) drying of the xerogel composite by conversion of the solvent (C) into the gaseous state at a temperature and a pressure below the critical temperature and the critical pressure of the solvent (C). The invention further relates to the xerogel composites which can be obtained in this way and their use as insulating material, for thermal insulation, vacuum insulation panels, in refrigeration units or in buildings.

13 Claims, No Drawings

METHOD FOR PRODUCING XEROGEL COMPOSITES

CROSS-REFERENCE TO RELATED APPLICATIONS

This application is a national stage application (under 35 U.S.C. §371) of PCT/EP2010/053193, filed Mar. 12, 2010, which claims benefit of European application 09155261.2, filed Mar. 16, 2009, the contents of each of which are incorporated herein by reference in their entireties.

FIELD OF THE INVENTION

The invention relates to a process for producing xerogel composites, which comprises:
(a) provision of a composition comprising an organic gel precursor (A) comprising a monomer component (A1) composed of at least one polyfunctional isocyanate and a monomer component (A2) composed of at least one compound selected from among polyfunctional amines and polyfunctional hydroxy compounds;
(b) reaction of the gel precursor (A) in the presence of an open-celled macroporous foam (B) and a solvent (C) to form a xerogel composite;
(c) drying of the xerogel composite by conversion of the solvent (C) into the gaseous state at a temperature and a pressure below the critical temperature and the critical pressure of the solvent (C).

The invention further relates to the xerogel composites which can be obtained in this way and their use as insulating material, for thermal insulation, vacuum insulation panels, in refrigeration units or in buildings.

BACKGROUND

Porous materials, for example polymer foams, having pores of a size in the range of a few microns or significantly less and a high porosity of at least 70% are particularly good thermal insulators for theoretical reasons.

Such porous materials having a small average pore diameter can, for example, be in the form of organic xerogels. The term xerogel is not always used uniformly in the literature. In general, a xerogel is understood to be a porous material which has been produced by a sol-gel process and the liquid phase has been removed from the gel by drying below the critical temperature and below the critical pressure of the liquid phase ("subcritical conditions"). In contrast, the term aerogels is generally used when the removal of the liquid phase from the gel has been carried out under supercritical conditions.

In the sol-gel process, a sol is firstly prepared from a reactive organic gel precursor and the sol is then gelled by means of a crosslinking reaction to form a gel. To obtain a porous material from the gel, for example a xerogel, the liquid has to be removed. This step will hereinafter be referred to as drying for the sake of simplicity.

In the processes of the prior art, the liquid can be removed from the gel under, for example, supercritical conditions or by means of supercritical fluids, i.e. at pressures and temperatures above the critical pressure $p_{crit}$ or the critical temperature $T_{crit}$ of the liquid. Such drying processes which include supercritical drying are widely known.

However, drying under supercritical conditions is very complicated in terms of apparatus since drying has to be carried out in closed vessels under defined pressure and temperature conditions. In addition, solvent changes are required. This additionally complicates the process. Drying using supercritical fluids therefore adversely affects the economics. As an alternative, the liquid can be removed by freeze drying. However, the liquid undergoes a change in volume on freezing, as a result of which the three-dimensional polymer framework is destroyed. A powder rather than a foam is obtained in this way. In addition, a freeze drying step is complicated in terms of apparatus.

If a gel is dried in a subcritical process step, then the pore structure generally changes and the gel shrinks with a simultaneous reduction in the porosity of the resulting xerogel compared to analogous removal of the solvent under supercritical conditions. The reason is the capillary forces which act during vaporization of the solvent under subcritical conditions. In addition, the capillary forces at average pore sizes of less than 1 micron are particularly strong since they increase in inverse proportion to decreasing pore size.

Known strategies for reducing the shrinkage comprise production of a sufficiently stiff or stable gel by means of specific compositions and reduction of the capillary forces, for example by replacement of the solvent by a less polar solvent which causes lower shrinkage on drying of the gel.

However, replacement of the solvent is complicated in terms of apparatus and in many cases is undesirable. In addition, the subcritical drying of the gel even after replacement of the solvent by one which causes reduced capillary forces nevertheless often leads to a reduction in the porosity.

Known organic xerogels are, for example, based on phenol-aldehyde resins or on polyurethane and/or polyurea. Processes for producing them which provide alternative measures for limiting the shrinkage during drying are likewise known per se. The known processes which do not require replacement of the solvent to be extracted are based on specific compositions which form a sufficiently stable porous material or on the use of fibrous reinforcing materials.

In addition, aerogel foam composites are known from WO-2007/146945. The aerogel foam composites mentioned comprise, in particular, inorganic aerogels which are cured in foams such as polyurethane foams, followed by a supercritical drying step. The publication mentions the possible use of organic aerogels and also the use of subcritical drying. The publication uses a foam matrix in order to reduce the inherent brittleness of the (inorganic) aerogels and at the same time improve further mechanical properties such as flexibility.

Xerogels based on polyurea or polyurethane are known per se and are often superior to inorganic aerogels in terms of the mechanical properties.

WO-2008/138978 discloses xerogels which are based on at least one polyfunctional isocyanate and at least one polyfunctional aromatic amine and whose volume-weighted average pore diameter is not more than 5 microns.

However, the thermal conductivity of the known xerogels is not sufficient for all applications. For applications in the pressure range above the vacuum range, for example in the pressure range from about 1 to about 100 mbar but in particular at atmospheric pressure, the thermal conductivity is generally not satisfactory. In addition, the materials properties, for example the mechanical stability of the xerogel, the porosity and in particular the density, are unsatisfactory.

Subcritical removal of the solvent is extremely desirable from the point of view of economical production. Thus, the xerogels are in this respect superior to the aerogels. The present invention relates exclusively to xerogels. Subcritical drying is generally ruled out for inorganic xerogels because of their poor mechanical properties.

BRIEF SUMMARY

It was therefore an object of the invention to avoid the abovementioned disadvantages. In particular it was an intention to provide a porous material which has a low thermal conductivity. In particular, the xerogels should have a low thermal conductivity even at pressures above the vacuum range, in particular in a pressure range from about 1 mbar to about 100 mbar and also at atmospheric pressure. This is desirable since a pressure increase occurs in vacuum panels over the course of time. In addition, the xerogels should have a low flammability and a high heat resistance and at the same time be mechanically stable.

A further object was to provide a xerogel having a small pore size, a high porosity and at the same time a high mechanical stability. In particular, the porosity should be increased further compared to known xerogels and the density should be reduced at the same time.

We have accordingly found the process defined at the outset and the organic xerogels which can be obtained by the process.

Preferred embodiments may be found in the claims and the description. Combinations of preferred embodiments are within the scope of the present invention.

DETAILED DESCRIPTION OF THE PREFERRED EMBODIMENTS

For the purposes of the present invention, a xerogel is a porous material which has a porosity of at least 70% by volume and a volume average pore size of not more than 50 microns and has been produced by a sol-gel process, with the liquid phase being removed from the gel by drying below the critical temperature and below the critical pressure of the liquid phase ("subcritical conditions").

Step (a)

According to the invention, step (a) comprises provision of a composition comprising an organic gel precursor (A) comprising a monomer component (A1) composed of at least one polyfunctional isocyanate and a monomer component (A2) composed of at least one compound selected from among polyfunctional amines and polyfunctional hydroxy compounds.

For the purposes of the present invention, the functionality of a compound is the number of reactive groups per molecule. In the case of monomer component (A1), the functionality is the number of isocyanate groups per molecule. In the case of the amino groups of the monomer component (A2), the functionality is the number of reactive amino or hydroxy groups per molecule. A polyfunctional compound has a functionality of at least 2.

If mixtures of compounds having different functionalities are used as monomer component (A1) and/or (A2), the functionality of the components is given in each case by the number average of the functionality of the individual compounds. A polyfunctional compound comprises at least two of the abovementioned functional groups per molecule.

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can, in particular, also be used as mixtures, so that in this case the component (A1) comprises various polyfunctional isocyanates. Polyfunctional isocyanates which are possible as constituents of component (A1) have two (hereinafter referred to as diisocyanates) or more than two isocyanate groups per molecule of the monomer component.

Particularly suitable polyfunctional isocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), dimethylbiphenyl 3,3'-diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or -2,6-diisocyanate and/or dicyclohexylmethane 4,4'-, 2,4'- and/or 2,2'-diisocyanate.

Aromatic isocyanates are preferred as polyfunctional isocyanates of the component (A1). Particularly preferred polyfunctional isocyanates of the component (A1) are the following embodiments:

i) polyfunctional isocyanates based on tolylene diisocyanate (TDI), in particular 2,4-TDI or 2,6-TDI or mixtures of 2,4- and 2,6-TDI;

ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the preparation of MDI or mixtures of at least one oligomer of MDI and at least one of the abovementioned low molecular weight MDI derivatives;

iii) mixtures of at least one aromatic isocyanate according to embodiment i) and at least one aromatic isocyanate according to embodiment ii).

Oligomeric diphenylmethane diisocyanate is particularly preferred as polyfunctional isocyanate. Oligomeric diphenylmethane diisocyanate (hereinafter referred to as oligomeric MDI) is an oligomeric condensation product or a mixture thereof and is thus composed of derivatives of diphenylmethane diisocyanate (MDI). The polyfunctional isocyanates can preferably also be made up of mixtures of monomeric aromatic diisocyanates and oligomeric MDI.

Oligomeric MDI comprises one or more polycyclic condensation products of MDI having a functionality of more than 2, in particular 3 or 4 or 5. Oligomeric MDI is known and is frequently referred to as polyphenylpolymethylene isocyanate or polymeric MDI. Oligomeric MDI is usually made up of a mixture of MDI-based isocyanates having various functionalities. Oligomeric MDI is usually used in admixture with monomeric MDI.

The (average) functionality of an isocyanate comprising oligomeric MDI can vary in the range from about 2.2 to about 5, in particular from 2.3 to 3.5, in particular from 2.5 to 3. Such a mixture of MDI-based polyfunctional isocyanates having various functionalities is, in particular, the crude MDI obtained in the preparation of MDI.

Polyfunctional isocyanates or mixtures of a plurality of polyfunctional isocyanates based on MDI are known and are marketed, for example, by Elastogran GmbH under the name Lupranat®.

The functionality of component (A1) is preferably at least two, in particular at least 2.2 and particularly preferably at least 2.5. The functionality of component (A1) is preferably from 2.2 to 4 and particularly preferably from 2.5 to 3.

The content of isocyanate groups in component (A1) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent are inversely proportional to one another. The content of isocyanate groups in mmol/g is derived from the content in % by weight as described in ASTM D-5155-96 A.

The viscosity of the component (A1) used can vary within a wide range. The component (A1) used in step (a) of the process of the invention preferably has a viscosity of from 100 to 3000 mPa·s, particularly preferably from 200 to 2500 mPa·s.

In a particularly preferred embodiment, the monomer component (A1) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate.

In this particularly preferred embodiment, component (A1) very particularly preferably comprises oligomeric diphenylmethane diisocyanate and has a functionality of at least 2.5.

According to the invention, the organic gel precursor (A) comprises a monomer component (A2) composed of at least one compound selected from among polyfunctional amines and polyfunctional hydroxy compounds. Polyfunctional amines are preferred for the purposes of the present invention. Possible polyfunctional amines are in principle both aliphatic and aromatic amines.

Insofar as aliphatic amines are used as polyfunctional amines, polyfunctional amines are, for the purposes of the present invention, amines which have at least two amino groups which are reactive toward isocyanates per molecule. Groups which are reactive toward isocyanates are primary and secondary amino groups, with the reactivity of the primary amino groups generally being significantly higher than that of the secondary amino groups. The polyfunctional aliphatic amines preferably comprise at least one primary amino group, in particular at least two primary amino groups.

Insofar as an aliphatic amine is used as polyfunctional amine, particularly useful polyfunctional amines are the following: bis(2-aminoethyl)amine, also referred to as diethylenetriamine, tris(2-aminoethyl)amine, triethylenetetramine and also further derivatives of ethylenimine, tetramethylenediamine, ethylenediamine, diamines of butane and of pentane, 2-methyl-1,5-diaminopentane, 1,6-diaminohexane, 1,7-diaminoheptane, 1,8-diaminooctane, 1,9-diaminononane, 1,10-diaminodecane, 1,12-diaminododecane, 1-amino-3-aminomethyl-3,5,5-trimethylcyclohexane, 4,4'-methylene-bis(cyclohexylamine), 4,4'-, 2,4'- and 2,2'-diaminodicyclohexyl-1,2- and 1,3-propanediamine, 2-methyl-1,2-diaminopropane, 2,2-dimethyl-1,3-diaminopropane, bis(4-amino-3-methylcyclohexyl)methane, 1,2- and/or 1,4-diaminocyclohexane, bis(1,3-methylamino)cyclohexane, bishydrazides, bissemicarbazides, N,N,N-tris(2-aminoethyl)amine, guanidine, N-(2-aminoethyl)-1,3-diaminopropane and ethoxylated and/or propoxylated compounds having amino groups as end group.

Aliphatic polyfunctional amines having at least two primary amino groups are preferred, in particular bis(2-aminoethyl)amine, tris(2-aminoethyl)amine, triethylenetetramine, ethylenediamine, tetraethylenepentamine, pentaethylenehexamine, diaminopropyleneethylenediamine, propylenediamine, hexamethylenediamine, diaminocyclohexane, triglycol diamine, polymers of alkylene oxides such as ethylene oxide or propylene oxide in which the hydroxyl end groups have been replaced by amino groups, 1,3-diaminopropan-2-ol, ω,ω'-diaminodi-n-hexylamine and dimethyl 1,4-diaminoadipate.

The suitable polyfunctional aliphatic amines can be used individually or in mixtures.

Particularly preferred aliphatic amines are polyalkylenepolyamines. For the purposes of the present invention, the term polyalkylenepolyamine refers to aliphatic amines which comprise at least three amino groups (primary, secondary or tertiary) and have a weight average molecular weight (Mw) of at least 500 g/mol.

The molecular weight of the possible polyalkylenepolyamines can vary within a wide range, in particular from 500 g/mol to 3 000 000 g/mol. The polyalkylenepolyamines preferred as component (A2) preferably have a weight average molecular weight (Mw) of from 500 g/mol to 50 000 g/mol, preferably from 800 g/mol to 25 000 g/mol, particularly preferably from 1000 g/mol to 10 000 g/mol.

As polyalkylenepolyamines, particular preference is given to, in particular, polyethylenimines. For the purposes of the present invention, polyethylenimines are both oligomers and homopolymers and copolymers which have the group —$CH_2$—$CH_2$—NH— and also comprise at least 3 amino groups and have a weight average molecular weight (Mw) of at least 500 g/mol.

The polyethylenimines are preferably made up of units selected from among terminal ethylenimine units of the structure —($CH_2$—$CH_2$—$NH_2$), linear ethylenimine units of the structure —($CH_2$—$CH_2$—NH)— and branched ethylenimine units of the structure N—($CH_2CH_2$—)$_3$.

If an aliphatic amine is used as amine, then polyethylenimine is particularly preferred. The molecular weight of the possible polyethylenimines can vary within a wide range, in particular from 500 g/mol to 3 000 000 g/mol. The polyethylenimines which are particularly preferred as component (A2) preferably have a weight average molecular weight (Mw) of from 500 g/mol to 500 000 g/mol, preferably from 800 g/mol to 200 000 g/mol, particularly preferably from 800 g/mol to 50 000 g/mol, in particular from 1000 g/mol to 25 000 g/mol, very particularly preferably from 1000 g/mol to 10 000 g/mol.

The weight average molecular weight of polyalkylenepolyamines is, for the purposes of the present invention, determined by means of static light scattering, on which all molecular weights of the polyalkylenepolyamines and polyethylenimines mentioned for the purposes of the present invention are based. Here, the refractive index increment do/dc is firstly determined by differential refractometry. The measurement by static light scattering is carried out in a thermodynamically good solvent. A person skilled in the art will additionally choose the concentration of the polyalkylenepolyamine in the solvent so that a dilute solution is present. The evaluation of the molecular weight is carried out by means of a Zimm plot.

The use of polyethylenimines having a high molecular weight or a high viscosity generally leads to gels or xerogels having particularly good properties, especially in respect of porosity, thermal conductivity and strength. The use of polyethylenimines having a low molecular weight or a low viscosity generally leads to particularly simple implementation of the production process combined with satisfactorily good properties, in particular in respect of porosity, thermal conductivity and strength.

The viscosity of the polyethylenimines is generally in the range from 100 to 300 000 mPa·s, preferably in the range from 500 to 200 000 mPa·s, in particular from 1000 to 100

000 mPa·s, determined in accordance with DIN EN ISO 2555 (viscometer model RVT from Brookfield, 20° C., 20 rpm).

Polyethylenimines can be obtained, for example, by the processes in Ullmann Electronic Release under the keyword "aziridines" or as described in WO-A 94/12560.

The ethylenimine homopolymers and oligomers based on ethylenimine can generally be obtained by polymerization of ethylenimine (aziridine) in aqueous or organic solution in the presence of acid-releasing compounds, acids or Lewis acids. Such homopolymers are linear or preferably branched polymers. The latter generally have primary, secondary and tertiary amino groups in a ratio of, for example, about 1:1:0.7. The distribution of the amino groups is determined by means of $^{13}$C-NMR spectroscopy.

If copolymers are used as polyethylenimine, comonomers having at least two amino functions are preferred. Suitable comonomers are, for example, alkylenediamines having from 2 to 10 carbon atoms in the alkylene radical, with ethylenediamine and propylenediamine being preferred. Further suitable comonomers are diethylenetriamine, triethylenetetramine, tetraethylenepentamine, dipropylenetriamine, tripropylenetetramine, dihexamethylenetriamine, aminopropylethylenediamine and bis-aminopropylethylenediamine.

However, preference is given to using polyethylenimines which are made up essentially of ethylenimine, in particular homopolymers of ethylenimine.

The polyethylenimines are preferably used in water-free form, with "water-free" meaning that the water content is from 0 to 1.5% by weight as determined by the Karl Fischer method in accordance with DIN 53715, preferably from 0 to 1% by weight, particularly preferably from 0 to 0.5% by weight.

The polyethylenimines are particularly preferably highly branched. For the purposes of the present invention, highly branched polyethylenimines are uncrosslinked macromolecules which bear —NH— groups and are nonuniform in terms of their structure, in particular in respect of the length and sequence of the sections between branching points. They can be built up from a central molecule in a manner analogous to dendrimers but with a nonuniform chain length of the branches. However, they can also have a linear structure with functional side groups or else, as a combination of the two extremes, have linear and branched parts of the molecule.

The degree of branching (DB) is defined as DB=(T+Z)/(T+Z+L), where T is the number of terminal monomer units, Z is the number of branched monomer units and L is the number of linear monomer units, and is usually reported in %. These numbers are determined by means of $^{13}$C nuclear magnetic resonance spectra as primary (gives T), tertiary (gives Z) and secondary (gives L) amino groups. For the definition of the degree of branching, see also H. Frey et al., Acta Polym. 1997, 48, 30.

The degree of branching DB of the particularly preferred highly branched polyethylenimines is from 40 to 100%, preferably from 50 to 80% and in particular from 55 to 70%.

Suitable polyethylenimines are commercially available, for instance as Lupasol® from BASF.

Highly branched polyethylenimines having from 2 to 6, in particular from 2 to 4, primary amino groups and a number average molecular weight of from 400 to about 10 000 g/mol, preferably from 800 to about 6000 g/mol, and a degree of branching DB of from 40 to 100%, preferably from 50 to 80% and in particular from 55 to 70%, are very particularly preferred.

If an aliphatic amine is used as monomer component (A2), then the monomer components (A1) and (A2) are preferably provided separately in step (a).

If an aliphatic amine is used as monomer component (A2), the primary amino groups of the monomer component (A2) are preferably present in protected form at the beginning of step (b). The primary amino groups of the monomer component (A2) are particularly preferably present in protected form before step (b) is carried out. Very particular preference is given to providing the monomer component (A2) with the primary amino groups in protected form in step (a), in particular by dissolution in an agent for the protection of primary amino groups which is simultaneously the solvent (C).

For the purposes of the present invention, primary amino groups present in protected form means that the primary amino groups are essentially not present in free form as —NH$_2$. The protected primary amino groups of the monomer component (A2) have a reduced reactivity toward isocyanates. The primary amino groups are preferably present in protected form as a result of reversible attachment of at least one further functional group or at least one further molecule (known as protective groups).

For the present purposes, reversible attachment means that the corresponding functional groups or molecules (protective groups) reduce the reactivity of the primary amino groups toward isocyanates but do not completely prevent the reaction, either as a result of them being eliminated in a targeted manner before the reaction of primary amino groups with isocyanate groups or, preferably, of further reactive primary amino groups being formed during the course of step (b) of the process of the invention, which leads to a reduced reaction rate for the reaction of primary amino groups with isocyanate groups. Such further formation can occur, for example, as a result of an equilibrium between the protected form and the reactive free form.

Particular preference is given to the primary amino groups of the monomer component (A2) in step (b) being present in the form of a ketimine and/or an aldimine. The monomer component (A2) is very particularly preferably provided in step (a) of the process of the invention in the form of a ketimine and/or aldimine.

This means that the primary amino groups of the monomer component (A2) are at least partly, preferably entirely, present in the form of a ketimine and/or aldimine group. The ketimine and/or aldimine can be obtained, in particular, by use of a ketone and/or aldehyde as solvent (C).

Suitable aldimines or ketimines are derived from diamines or polyfunctional amines having primary amino groups and aldehydes or ketones and can be obtained from these substances in a manner known per se, for example by heating in an inert organic solvent, if appropriate with removal of the water formed, if appropriate in the presence of, for example, an acid as catalyst, but preferably by reaction in an excess of ketone and/or aldehyde as solvent. The aldimines or ketimines can also comprise further functional groups which are reactive toward isocyanate, for example hydroxyl or imino groups.

Further possibilities are ketimines or aldimines which comprise not only protected primary amino groups but also free secondary amino groups, for example the diketimine of diethylenetriamine with methyl isobutyl ketone.

If the protective group is eliminated by addition of a dissociation agent before or during step (c), the protective group in the case of aldimines and ketimines can be eliminated, in particular, by addition of water as dissociation agent.

However, the aldimines and/or ketimines are preferably reacted without prior addition of a dissociation agent in a retarded reaction with isocyanates in step (b) of the process of the invention. Here, an equilibrium between free and protected primary amino groups in the solvent (C) is preferably exploited.

The reaction products of polyfunctional aldimines and/or ketimines and polyisocyanates are chemically identical or largely identical to those from a direct reaction of amino groups and isocyanate groups. However, the reduction in the reaction rate of primary aliphatic amino groups and isocyanate groups has a positive influence on, in particular, the pore structure of the gel formed in step (b).

The protective groups which react reversibly with primary amines are preferably liquid under the experimental conditions. The protective groups are preferably used in the form of a solvent (C) which is reactive toward primary amino groups.

Very particular preference is given to the monomer component (A2) being provided as a solution in a ketone and/or aldehyde as solvent (C) in step (a) and being combined with the monomer component (A1) in step (b).

Aldehydes or ketones which can be used for preparing the aldimines or ketimines are, in particular, those corresponding to the general formula $R^2$—(CO)—$R^1$, where $R^1$ and $R^2$ are each hydrogen or an alkyl group having 1, 2, 3 or 4 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexene aldehyde, cyanacetaldehyde, ethyl glyoxylate, benzaldehyde, acetone, methyl isobutyl ketone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone and acetophenone. The abovementioned aldehydes and ketones can also be used in the form of mixtures.

It is in principle possible to prepare an aldimine or ketimine beforehand in pure form and subsequently provide it as a solution in a solvent (C). However, the abovementioned aldehydes and/or ketones are preferably used as solvent (C) in the process of the invention, with the formation of the aldimine or ketimine occurring on dissolution of the component (A2).

It is desirable for the aldehyde or the ketone to have a boiling point below about 180° C. so that it can easily be given off from the polymer during the setting stage.

The monomer components (A1) and (A2) are preferably dissolved separately from one another in a solvent (C), in particular an aldehyde and/or ketone.

Suitable solvents (C) are, in particular, aldehydes and/or ketones in which both components (A1) and (A2) have a sufficient solubility and in which an aldimine and/or ketimine is formed by reaction with the primary amino groups of the monomer component (A2), preferably at room temperature.

The two monomer components (A1) and (A2) can in principle be dissolved in different solvents (C1) and (C2) as long as the solvents are completely miscible with one another and the two components (A1) and (A2) each have a sufficient solubility in the solvent mixture.

It is also possible to use polyfunctional hydroxy compounds as monomer component A2. Such hydroxy compounds are known per se to those skilled in the art. Possibilities are, for example, polyether polyols, in particular those based on ethylene oxide and/or propylene oxide, polyester polyols or polyether ester polyols having an OH functionality of at least 2. The molecular weight can vary over a wide range. Possible polyols of this type are in principle all precursors known to those skilled in the art for polyurethanes. If polyfunctional hydroxy compounds are used as monomer component A2, the polyfunctional hydroxy compounds are, in a preferred embodiment, phenolic compounds, i.e. aromatic hydroxy compounds. Preferred polyfunctional phenolic hydroxy compounds are resorcinol, catechol, hydroquinone and phloroglucinol, phloroglucinol being particularly preferred.

However, the monomer component (A2) preferably comprises at least one polyfunctional aromatic amine.

The monomer component (A2) preferably comprises at least one polyfunctional aromatic amine of which at least one is selected from among 4,4'-methylenebis(2-chloroaniline), 4,4'-diaminodiphenylmethane, 2,4'-diaminodiphenylmethane, 2,2'-diaminodiphenylmethane and oligomeric diaminodiphenylmethane.

If 4,4'-diaminodiphenylmethane, 2,4'-diaminodiphenylmethane, 2,2'-diaminodiphenylmethane and/or oligomeric diaminodiphenylmethane are used in admixture with a further polyfunctional aromatic amine as monomer component (A2), possibilities for further polyfunctional aromatic amines are preferably toluenediamine, in particular toluene-2,4-diamine and/or toluene-2,6-diamine and diethyltoluenediamine, in particular 3,5-diethyltoluene-2,4-diamine and/or 3,5-diethyltoluene-2,6-diamine, and also 4,4'-methylenebis (2-chloroaniline).

The monomer component (A2) particularly preferably comprises at least one polyfunctional aromatic amine selected from among 4,4'-methylenebis(2-chloroaniline), 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one oligomer but generally more than one oligomer of MDA having a functionality of more than 2, in particular 3 or 4 or 5. Oligomeric MDA is known or can be prepared by methods known per se. Oligomeric MDA is usually used in the form of mixtures with monomeric MDA.

The (average) functionality of a polyfunctional amine comprising oligomeric MDA can vary in the range from about 2.2 to about 5, in particular from 2.3 to 3.5 and in particular from 2.5 to 3. Such a mixture of MDA-based polyfunctional amines having various functionalities is, in particular, crude MDA which is formed, in particular, in the condensation of aniline with formaldehyde, usually catalyzed by hydrochloric acid, as intermediate in the preparation of crude MDI. The monomer component (A2) preferably comprises oligomeric diaminodiphenylmethane and preferably has a functionality of at least 2.5.

The use ratio (equivalence ratio) of NCO groups of the monomer component (A1) to amino groups of the monomer component (A2) is preferably from 0.9:1 to 1.3:1. Particular preference is given to the equivalence ratio of NCO groups of the monomer component (A1) to reactive groups of the monomer component (A2) being from 0.95:1 to 1.2:1, in particular from 1:1 to 1.1:1.

In a preferred embodiment, the monomer components (A1) and (A2) are firstly provided separately from one another each in a solvent (C) and finally combined at the beginning of step (b). The process of the invention accordingly preferably comprises the following steps:

(a-1) provision of the monomer components (A1) and (A2) separately from one another each in a solvent (C);

(a-2) provision of a gel precursor (A) comprising the monomer components (A1) and (A2) in a solvent (C) by combining of the monomer components provided in step (a-1);

(b) reaction of the gel precursor (A) in the presence of an open-celled macroporous foam and the solvent (C) to form a gel;

(c) drying of the gel obtained in the preceding step by conversion of the liquid comprised in the gel into the gaseous state at a temperature and a pressure below the critical temperature and the critical pressure of the liquid comprised in the gel.

The monomer components (A1) and (A2) are present in monomeric form in the gel precursor (A) or have been converted beforehand by partial or nonequimolar reaction of isocyanate and amino groups into a prepolymer which, if appropriate together with further monomer components (A1) or (A2), forms the gel precursor (A). The gel precursor (A) is thus gellable, i.e. it can be converted into a gel by crosslinking. The proportions of the monomer components (A1) and (A2) in the xerogel in which they are present in polymeric form correspond to the proportions of the monomer components (A1) and (A2) in the gel precursor (A) in which they are present in as yet unreacted monomeric form.

The term gel precursor (A) denotes the gellable mixture of the components (A1) and (A2). The gel precursor (A) is subsequently converted in the presence of the solvent (C) into a gel, viz. a crosslinked polymer, in step (b).

A person skilled in the art will know that amines, in particular diamines, are formed when isocyanates, in particular diisocyanates, are reacted with water. Accordingly, it is possible to use polyfunctional isocyanates and an equivalent amount of water in place of the corresponding polyfunctional amines as component (A2), so that the desired amount of polyfunctional amine is formed in situ or in a prior reaction. When an excess of the component (A1) is used and water is added at the same time, the component (A1) can be proportionately converted in situ into component (A2) which then reacts directly with the remaining component (A1) to form urea linkages.

However, the polyfunctional amine is preferably not generated from the component (A2) in the solvent (C) in the presence of the monomer component (A1) but is instead added separately as component (A2). Accordingly, the mixture provided in step (a) preferably does not comprise any water.

Step (b)

According to the invention, the gel precursor (A) is reacted in step (b) in the presence of an open-celled macroporous foam (B) and a solvent (C) to form a gel.

For the purposes of the present invention, macroporous means that the average pore diameter is more than 1 micron (1000 nm), preferably more than 10 microns, particularly preferably more than 50 microns, determined by mercury intrusion in accordance with DIN 66133. The value determined in this way is a volume-weighted average pore diameter.

The mercury intrusion measurement in accordance with DIN 66133 is a porosimetric method and is usually carried out in a porosimeter. Here, mercury is pressed into a sample of the porous material. Small pores require a higher pressure to be filled with the mercury than do large pores, and a pore size distribution can be determined from the corresponding pressure-volume graph.

In the case of foams, open-celled means that the majority of the foam cells are not closed but are instead connected to one another. The proportion by volume of the pores which are not connected to one another but are instead closed (non-open-celled or closed proportion) is preferably less than 50% by volume in the case of open-celled foams. The non-open-celled proportion by volume of the pores in open-celled foams is particularly preferably not more than 30% by volume, for example not more than 20% by volume and in particular not more than 10% by volume.

In the case of open-celled foams, the average pore diameter is preferably the average size of the pores bounded by walls and/or struts. The average pore diameter is determined as volume-weighted average by means of mercury intrusion in accordance with DIN 66133, to which the pore diameters of the uncoated substrates indicated in the present invention refer. Suitable foams usually have, depending on the chemical composition (see below), a density of from 5 to 500 g/dm$^3$, preferably from 10 to 300 g/dm$^3$ and particularly preferably from 15 to 200 g/dm$^3$, determined in accordance with DIN EN ISO 845, before the reaction.

The intrinsic surface area of the foams before the reaction is generally up to 30 m$^2$/g, for example from 1 to 20 m$^2$/g, determined by means of gas adsorption in accordance with the BET method (Brunauer, Emmet, Teller method in accordance with DIN 66131).

Chemically, the foam (B) is based on at least one organic polymer. Here, "based on" means a proportion of at least 50% by weight, preferably at least 60% by weight, particularly preferably at least 70% by weight and in particular at least 80% by weight, of the substrate.

It is in principle possible to use all organic polymers which can be processed to give a foam as foam (B). The foam (B) is preferably selected from among amino-aldehyde resins, phenol-aldehyde resins, polystyrene, polyvinyl chloride, polyurethanes, polyamides, polyesters, polyolefins and cellulose.

The open-celled macroporous foam is preferably based on an amino resin, preferably melamine-formaldehyde. Such foams are known to those skilled in the art or can be produced by known methods. Appropriate foams based on melamine-formaldehyde are, for example, the Basotect® products from BASF SE.

The density of the open-celled foam is generally in the range from 3 to 100 g/l, preferably in the range from 5 to 20 g/l. The cell count is usually in the range from 50 to 300 cells/25 mm. The tensile strength is preferably in the range from 100 to 150 kPa and the elongation at break is preferably in the range from 8 to 20%.

To produce an open-celled foam based on the melamine-formaldehyde (MF) resin preferred as amino resin, a highly concentrated, blowing agent-comprising solution or dispersion of a melamine-formaldehyde precondensate can, as described in EP-A 071 672 or EP-A 037 470, be foamed and cured by means of hot air, steam or microwave radiation.

The molar ratio of melamine to formaldehyde is generally less than 1:1.0, preferably in the range from 1:1 to 1:5, in particular from 1:1.3 to 1:1.8. It has been found that a relatively high sulfite group content at a constant melamine to formaldehyde ratio results in a higher formaldehyde emission from the foam. The precondensate used should therefore comprise virtually no sulfite groups, i.e. the sulfite group content should be less than 1%, preferably less than 0.1% and in particular 0%.

Without treatment, the melamine foam is hydrophilic and can easily be crumbled. It can be made hydrophobic by chemical modification or after-treatment and/or be made more dimensionally stable by means of reinforcing components as described in DE-A 10 2007 009127.

The combination of xerogels composed of polyurea and foams composed of melamine-formaldehyde leads to xerogel composites having a particularly advantageous porosity and density.

Possible solvents (C) are in principle an organic compound or a mixture of a plurality of compounds, with the solvent (C) being liquid under the temperature and pressure conditions under which the mixture in step (a) is provided ("dissolution conditions" for short). The composition of the solvent (C) is selected so that it is able to dissolve or disperse, preferably dissolve, the organic gel precursor. Preferred solvents (C) are ones which are solvents for the organic gel precursor (A), i.e. ones which completely dissolve the organic gel precursor (A) under reaction conditions.

The reaction product from step (b) is a gel, i.e. a viscoelastic chemical framework swollen by the solvent (C). A solvent (C) which represents a good swelling agent for the framework formed in step (b) generally leads to a framework having fine pores and a small average pore diameter, while a solvent (C) which is a poor swelling agent for the gel resulting from step (b) generally leads to a coarse-pored framework having a large average pore diameter.

The choice of solvent (C) thus influences the desired pore size distribution and the desired porosity. The choice of solvent (C) is moreover generally made so that precipitation or flocculation due to formation of a precipitated reaction product does not occur to a significant extent during or after step (b) of the process of the invention.

When choosing a suitable solvent (C), the proportion of precipitated reaction product is usually less than 1% by weight, based on the total weight of the mixture. The amount of precipitated product formed in a particular solvent (C) can be determined gravimetrically by filtering the reaction mixture through a suitable filter before the gel point.

Possible solvents (C) are the solvents known from the prior art for isocyanate-based polymers. Preferred solvents are ones which are a solvent for both the components (A1) and (A2), i.e. ones which virtually completely dissolve the components (A1) and (A2) under reaction conditions so that the content of the organic gel precursor (A) in the total mixture including the solvent (C) provided in step (a) is preferably at least 5% by weight. The solvent (C) is preferably inert (i.e. unreactive) toward component (A1).

Possible solvents (C) are, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorine-comprising ethers. Mixtures of two or more of the abovementioned compounds are likewise possible.

Further possible solvents (C) are acetals, in particular diethoxymethane, dimethoxymethane and 1,3-dioxolane.

Dialkyl ethers and cyclic ethers are likewise suitable as solvents (C). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

In addition, alkyl alkanoates, in particular methyl formate, methyl acetate, ethyl formate, butyl acetate and ethyl acetate, are suitable as solvents (C). Preferred halogenated solvents are described in WO 00/24799, page 4, line 12 to page 5, line 4.

Aldehydes and/or ketones are particularly preferred as solvents (C). Aldehydes or ketones suitable as solvents (C) are in particular, those corresponding to the general formula $R^2$—(CO)—$R^1$, where $R^1$ and $R^2$ are each hydrogen or alkyl groups having 1, 2, 3 or 4 carbon atoms. Suitable aldehydes or ketones are, in particular, those described above in the context of aldimine and/or ketimine formation. The abovementioned aldehydes and ketones can also be used in the form of mixtures. Ketones and aldehydes having alkyl groups having up to 3 carbon atoms per substituent are preferred as solvents (C). Particular preference is given to acetone.

Dialkyl ethers, cyclic ethers, ketones and esters are very particularly preferred as solvents (C).

In many cases, particularly useful solvents (C) are obtained by using two or more completely miscible compounds selected from the abovementioned solvents in the form of a mixture.

The gel precursor (A) can be brought into contact with the foam (B) by conventional methods. Preference is given to impregnating the foam (B) with the gel precursor (A) and in particular dipping the foam (B) into the gel precursor (A) which is present as a solution in the solvent (C). It is important that complete wetting of the accessible pores of the foam (B) is ensured. The reaction in step (b) forms the xerogel composite of the invention or a precursor thereof, with the xerogel composite or the precursor thereof still comprising solvent (C), in particular in the xerogel part of the composite.

The xerogel composite thus comprises a gel part and the foam (B) which forms a supporting and stabilizing matrix for the xerogel. As a result of the open-celled structure, the composite is obtained in the form of an interpenetrating framework. In the following, the gel part of the composite will be referred to by the term "gel".

To obtain a gel having stable mechanical properties in step (b), the proportion of the gel precursor (A) in the total mixture provided in step (a) of the process of the invention should generally be not less than 5% by weight. The proportion of the gel precursor (A) in the total mixture including the solvent (C) provided in step (a) of the process of the invention is preferably at least 6% by weight, particularly preferably at least 8% by weight, in particular at least 10% by weight.

On the other hand, the concentration of the gel precursor (A) in the mixture provided cannot be too high since otherwise no xerogel having advantageous properties is obtained. In general, the proportion of the gel precursor (A) in the total mixture provided in step (a) of the process of the invention is not more than 40% by weight. The proportion of the gel precursor (A) in the total mixture including the solvent (C) provided in step (a) of the process of the invention is preferably not more than 35% by weight, particularly preferably not more than 25% by weight, in particular not more than 20% by weight.

The mixture provided in step (a) optionally comprises, as further component (B), at least one catalyst (b1). However, the reaction of the gel precursor (A) is preferably carried out without the presence of a catalyst.

If a catalyst (b1) is used, use is usually made of trimerization catalysts which catalyze the formation of isocyanurates or, if hydroxy compounds are used as monomer component (A2), catalysts which catalyze the formation of polyurethanes. As trimerization catalysts of this type, it is possible to use, for example, catalysts which are widely known to those skilled in the art, for example those indicated below. Polyurethane catalysts are likewise known to those skilled in the art.

If trimerization catalysts are used as component (b1), known catalysts such as quaternary ammonium hydroxides, alkali metal and alkaline earth metal hydroxides, alkoxides and carboxylates, e.g. potassium acetate and potassium 2-ethylhexanoate, certain tertiary amines and nonbasic metal carboxylates, e.g. lead octoate, and triazine derivatives, in particular symmetrical triazine derivatives, are suitable. Triazine derivatives are particularly useful as trimerization catalysts.

The components (A1) and (A2) are preferably used in such amounts that the gel precursor (A) comprises from 30 to 90% by weight of component (A1) and from 10 to 70% by weight of component (A2). The gel precursor (A) preferably comprises from 40 to 80% by weight of component (A1) and from 20 to 60% by weight of component (A2). The gel precursor (A) particularly preferably comprises from 50 to 70% by weight of component (A1) and from 30 to 50% by weight of component (A2).

The mixture provided in step (a) can also comprise customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides.

More detailed information on the abovementioned auxiliaries and additives may be found in the specialist literature, e.g. from Plastics Additive Handbook, 5th edition, H. Zweifel, ed, Hanser Publishers, Munich, 2001.

Provision of the composition as for step (a) of the process of the invention can be effected in a customary manner. Preference is given to using a stirrer or another mixing apparatus for this purpose in order to achieve good mixing. The other mixing conditions are generally not critical; for example, mixing can be carried out at from 0 to 100° C. and from 0.1 to 10 bar (absolute), in particular, for example, at room temperature and atmospheric pressure.

In step (b) of the process of the invention, the organic gel precursor (A) is converted in a gelling reaction in the presence of the foam (B) into a xerogel composite which has the above-described proportion of gel. The gelling reaction is a polyaddition reaction, in particular a polyaddition of isocyanate groups and amino groups.

For the purposes of the present invention, a gel is a crosslinked system based on a polymer which is in contact with a liquid (known as solvogel or lyogel, or with water as liquid: aquagel or hydrogel). The polymer phase forms a continuous three-dimensional framework.

In step (b) of the process of the invention, the gel is usually formed by allowing to rest, e.g. by simply allowing the vessel, reaction vessel or reactor in which the mixture is present (hereinafter referred to as gelling apparatus) to stand. The mixture is preferably not stirred or mixed during gelling (gel formation) because this could hinder formation of the gel. It has been found to be advantageous to cover the mixture during gelling or to close the gelling apparatus.

The duration of gelling varies according to the type and amount of the components used and the temperature and can be a number of days. It is usually from 1 minute to 10 days, preferably less than 1 day, in particular from 5 minutes to 12 hours, particularly preferably not more than 1 hour, in particular from 5 minutes to 1 hour.

Gelling can be carried out without introduction of heat at a temperature in the region of room temperature, in particular from 15 to 25° C., or at a temperature which is above room temperature and is 20° C. or more, in particular from 25° C. to 80° C. A higher gelling temperature usually shortens the duration of gelling. However, a higher gelling temperature is not advantageous in all cases since an increased gelling temperature can lead to gels having unsatisfactory mechanical properties. Gelling is preferably carried out at a temperature in the region of room temperature, in particular from 15° C. to 25° C.

The pressure during gelling can vary within a wide range and is generally not critical. It can be, for example, from 0.1 bar to 10 bar, preferably from 0.5 bar to 8 bar and in particular from 0.9 to 5 bar (in each case absolute). In particular, aqueous mixtures can be allowed to gel at room temperature and atmospheric pressure.

In a preferred embodiment, the gel obtained by gelling in step (b) is subjected to aging, during which formation of the gel is completed, before step (c) is carried out. Aging is effected, in particular, by subjecting the gel to a higher temperature than during the preceding gelling for some time. For this purpose, it is possible to use, for example, a heating bath or an oven or to heat the apparatus or environment in which the gel is present in a suitable way.

The temperature during aging can vary within a wide range and is not critical per se. In general, aging is carried out at temperatures of from 30° C. to 150° C., preferably from 40° C. to 100° C. The aging temperature should be in the range from 10° C. to 100° C. above, in particular from 20° C. to 80° C. above, the gelling temperature. If gelling was carried out at room temperature, aging can, in particular, be carried out at temperatures of from 40° C. to 80° C., preferably at about 60° C. The pressure during aging is not critical and is usually from 0.9 to 5 bar (absolute).

The duration of aging depends on the type of gel and can be a few minutes but can also be a long time. The duration of aging can be, for example, up to 30 days. The duration of aging is usually from 10 minutes to 12 hours, preferably from 20 minutes to 6 hours and particularly preferably from 30 minutes to 5 hours.

Step (c)

According to the invention, the xerogel composite obtained in the previous step is dried in step (c) by conversion of the liquid comprised in the gel into the gaseous state at a temperature and a pressure below the critical temperature and the critical pressure of the liquid comprised in the gel.

Drying of the gel obtained is preferably carried out by conversion of the solvent (C) into the gaseous state at a temperature and a pressure below the critical temperature and the critical pressure of the solvent (C). Accordingly, drying is preferably effected by removal of the solvent (C) which was present in the reaction without prior replacement by a further solvent.

Accordingly, the xerogel composite is preferably not brought into contact with an organic liquid after step (b) in order to replace the solvent (C) comprised in the gel, in particular in the pores of the gel, by this organic liquid. This is the case irrespective of whether the gel has been aged or not. The omission of a solvent exchange makes the process particularly simple and inexpensive to carry out. If a solvent exchange is nevertheless carried out, preference is given to replacing the solvent (C) by a nonpolar solvent, in particular a hydrocarbon such as pentane.

Possible ways of carrying out the drying by conversion of the liquid comprised in the xerogel composite, preferably the solvent (C), into the gaseous state are in principle both evaporation and vaporization, but not sublimation. Drying by evaporation or vaporization includes, in particular, drying under atmospheric pressure, drying under reduced pressure, drying at room temperature and drying at elevated temperature, but not freeze drying. According to the invention, drying is carried out at a pressure and a temperature below the critical pressure and below the critical temperature of the liquid comprised in the xerogel composite. The solvent-comprising xerogel composite is thus dried in step (c) of the process of the invention to form the finished xerogel composite as process product.

To dry the xerogel composite, it is usual to open the gelling apparatus and keep the gel under the pressure and temperature conditions mentioned until the liquid phase has been removed by conversion into the gaseous state, i.e. the liquid phase evaporates or vaporizes. To accelerate evaporation, it is frequently advantageous to remove the xerogel composite from the container. In this way, the phase boundary area between gel/ambient air via which evaporation and/or vaporization takes place is increased. For example, the xerogel composite can be placed on a flat substrate or a sieve for drying. Possible drying processes are, in addition, the drying processes with which a person skilled in the art will be familiar, e.g. convection drying, microwave drying, vacuum drying ovens or combinations of these processes.

The xerogel composite can be dried in air or, if it is oxygen-sensitive, in other gases such as nitrogen or noble gases, if appropriate using a drying oven or other suitable apparatuses in which the pressure, the temperature or the solvent content of the environment can be controlled.

The temperature and pressure conditions to be selected during drying depend, inter alia, on the nature of the liquid present in the gel part. According to the invention, drying is carried out at a pressure which is below the critical pressure $p_{crit}$ of the liquid present in the xerogel composite, preferably the solvent (C), and at a temperature which is below the critical temperature $T_{crit}$. Drying is accordingly carried out under subcritical conditions. Here, critical has the following meaning: at the critical pressure and the critical temperature the density of the liquid phase is equal to the density of the gas phase (known as critical density) and at temperatures above $T_{crit}$ the liquid phase can no longer be liquefied even by application of very high pressures.

If acetone is used as solvent, drying is carried out at temperatures of from 0° C. to 150° C., preferably from 10° C. to 100° C. and particularly preferably from 15° C. to 80° C., and at pressures ranging from a high vacuum, for example $10^{-3}$ mbar to 5 bar, preferably from 1 mbar to 3 bar and in particular from 10 mbar to about 1 bar (absolute). For example, drying can be carried out at atmospheric pressure and from 0° C. to 80° C., in particular at room temperature. The xerogel composite is particularly preferably dried at a pressure of from 0.5 to 2 bar (absolute) and a temperature of from 0 to 100° C. in step (c).

Other liquids present in the xerogel composite, in particular solvents (C) other than acetone, require modifications of the drying conditions (pressure, temperature, time) and these can be determined by a person skilled in the art by means of simple tests.

Drying can be accelerated or completed by application of a vacuum. To improve the drying action further, this vacuum drying can be carried out at a higher temperature than the drying at conventional pressure. For example, the major part of the solvent (C) can firstly be removed at room temperature and atmospheric pressure over a period of from 30 minutes to 3 hours and the xerogel composite can then be dried at from 40 to 80° C. under a reduced pressure of from 1 to 100 mbar, in particular from 5 to 30 mbar, for a period of from 10 minutes to 6 hours. Of course, longer drying times are also possible, for example from 1 to 5 days. However, drying times of less than 12 hours are frequently preferred.

Instead of such stepwise drying, it is also possible to reduce the pressure continuously, for example linearly or exponentially, during drying or to increase the temperature in such a way, i.e. according to a pressure or temperature program. Naturally, the xerogel composite will dry faster, the lower the moisture content of the air. The same applies analogously to liquid phases other than water and gases other than air.

The preferred drying conditions depend not only on the solvent but also on the nature of the xerogel composite, in particular the stability of the framework relative to the capillary forces which act during drying.

During drying in step (c), the liquid phase is generally removed completely or to a residual content of from 0.01 to 1% by weight, based on the xerogel composite obtained.

When reference is made to xerogels or the properties or composition thereof, this is intended to refer to the constituent comprising the xerogel in the xerogel composite of the invention.

The xerogel composite which can be obtained by the process of the invention preferably has a volume-weighted average pore diameter of not more than 30 microns, in particular not more than 20 microns, particularly preferably not more than 10 microns.

Although a very low pore size at a high porosity is desirable from the point of view of a low thermal conductivity, due to the production process and to obtain a material which is sufficiently mechanically stable there is a practical lower limit to the volume-weighted average pore diameter. In general, the volume-weighted average pore diameter is at least 200 nm, preferably at least 400 nm. In many cases, the volume-weighted average pore diameter is at least 500 nm, in particular at least 1 micron.

The xerogel composite of the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the stated proportion of the total volume of the xerogel composite consists of pores. Although a very high porosity is usually desirable from the point of view of a minimal thermal conductivity, an upper limit is placed on the porosity by the mechanical properties and the processability of the xerogel.

According to the invention, the monomer components (A1) and (A2), hereinafter referred to as components (A1) and (A2), are present in polymeric form in the xerogel. Owing to the composition according to the invention, the components (A1) and (A2) are bound predominantly via urea linkages in the xerogel. A further possible mode of bonding in the xerogel comprises isocyanurate linkages which are formed by trimerization of isocyanate groups of the component (A1). If the xerogel comprises further monomer components, further possible linkages are, for example, urethane groups formed by reaction of isocyanate groups with alcohols or phenols.

The components (A1) and (A2) are preferably bound via urea groups —NH—CO—NH— to an extent of at least 50 mol % in the xerogel. The components (A1) and (A2) are more preferably bound via urea groups to an extent of from 50 to 100 mol % in the xerogel, in particular from 60 to 100 mol %, very particularly preferably from 70 to 100 mol %, in particular from 80 to 100 mol %, for example from 90 to 100 mol %.

The balance to 100 mol % is present as further linkages, in particular as isocyanurate linkages. However, the further linkages can also be in the form of other linkages of isocyanate polymers known to those skilled in the art. Examples which may be mentioned are ester, urea, biuret, allophanate, carbodiimide, isocyanurate, uretdione and/or urethane groups.

The determination of the mol % of the linkages of the monomer components in the xerogel is carried out by means of NMR spectroscopy (nuclear spin resonance) in the solid or in the swollen state. Suitable methods of determination are known to those skilled in the art.

The xerogel preferably comprises from 40 to 80% by weight of the monomer component (A1) and from 20 to 70% by weight of the monomer component (A2). The xerogel particularly preferably comprises from 50 to 70% by weight of the monomer component (A1) and from 30 to 50% by weight of the monomer component (A2).

The density of the organic xerogel composites which can be obtained by the process of the invention is usually from 20 to 600 g/l, preferably from 50 to 500 g/l and particularly preferably from 70 to 400 g/l.

The xerogel composites of the invention and the xerogel composites which can be obtained by the process of the invention have a low thermal conductivity, a high porosity and a low density. According to the invention, the xerogel composites have a low average pore size. The combination of the abovementioned properties allows the use as insulating material in the field of thermal insulation, in particular for applications in the vacuum field where a very low thickness of vacuum boards is preferred, for example in refrigeration appliances or in buildings. Use in vacuum insulation panels, in particular as core material for vacuum insulation panels, is thus preferred. In addition, the use of the xerogels of the invention as insulating material is preferred.

Furthermore, the low thermal conductivity of the xerogel composites of the invention makes applications at pressures of from 1 to 100 mbar and in particular from 10 mbar to 100 mbar possible. The property profile of the xerogel composites of the invention opens up, in particular, applications in which a long life of the vacuum panels is desired and the panels still have a low thermal conductivity even after a pressure increase of about 2 mbar per year over many years, for example at a pressure of 100 mbar. The xerogel composites of the invention and the xerogel composites which can be obtained by the process of the invention have both favorable thermal properties and favorable materials properties, for example simple processability and high mechanical stability, e.g. low brittleness.

EXAMPLES

The determination of the pore volume in ml per g of sample and the average pore size of the materials was carried out by means of mercury porosimetry in accordance with DIN 66133 (1993) at room temperature. The average pore size is, for the purposes of the present invention, equal to the average pore diameter. The volume-weighted average pore diameter is calculated from the pore size distribution determined in accordance with the abovementioned standard.

The porosity in % by volume was calculated according to the formula $P=(V_i/(V_i+V_s))*100\%$ by volume, where P is the porosity, $V_i$ is the Hg intrusion volume in accordance with DIN 66133 in ml/g and $V_s$ is the specific volume in ml/g of the test specimen.

The density p of the porous material in g/ml was calculated according to the formula $\rho=1/(V_i+V_s)$. A value of $1/V_s=1.68$ g/ml was used as specific volume for porous materials based on melamine and formaldehyde and a value of $1/V_s=1.38$ g/ml was used as specific volume for porous materials based on isocyanate. Both values were determined by He pycnometry.

The thermal conductivity $\lambda$ is determined by means of the dynamic hotwire method. In the hotwire method, a thin wire which serves simultaneously as heating element and temperature sensor is embedded in the specimen to be examined. A platinum wire having a diameter of 100 microns and a length of 40 mm was used as wire material and was embedded between two halves of the respective test specimen. The measurement assembly of specimen and hotwire was prepared in an evacuatable receptacle in which the desired pressure was set after evacuation by admission of gaseous nitrogen.

During the experiment, the wire was heated at constant power. The temperature was 25° C. The temperature increase over time at the site of the hotwire was determined by measuring the resistance. The thermal conductivity was determined by fitting of an analytical solution to the temperature-time curve taking into account a thermal contact resistance between specimen and wire and also axial heat losses, as described in H.-P. Ebert et al., High Temp.-High. Press, 1993, 25, 391-401. The determination of the gas pressure was carried out using two capacitative pressure sensors having different measurement ranges (from 0.1 to 1000 mbar and from 0.001 to 10 mbar).

Example 1

0.72 g of Lupranat® M200R, an oligomeric MDI having an NCO content of 30.9 g per 100 g in accordance with ASTM D-5155-96 A, a functionality in the region of three and a viscosity of 2100 mPa·s at 25° C. in accordance with DIN 53018, was dissolved in 5.65 g of acetone while stirring at 20° C. in a glass beaker. 0.52 g of 4,4'-diaminodiphenylmethane was dissolved in 5.70 g of acetone in a second glass beaker. The two solutions from step (a) were mixed. This gave a clear, low-viscosity mixture in which 0.12 g of a foam of melamine-formaldehyde resin was immersed. The foam Basotect from BASF was used. The foam was cylindrical and was completely covered by the mixture. The mixture and the immersed foam were allowed to stand at room temperature for 24 hours to effect curing. The gel obtained in (c) was subsequently taken from the glass beaker and the liquid (acetone) was removed by drying at 20° C. for 7 days.

The material obtained had a pore volume of 7.9 ml/g and an average pore diameter of 9.1 µm. The porosity was 91% by volume with a corresponding density of 115 g/l.

The material obtained had a thermal conductivity $\lambda$ of 33.2 mW/m*K at 26.6° C.

Example 1C 0.72 g of Lupranat® M200R having an NCO content of 30.9 g per 100 g in accordance with ASTM D-5155-96 A, a functionality in the region of three and a viscosity of 2100 mPa·s at 25° C. in accordance with DIN 53018, was dissolved in 5.65 g of acetone while stirring at 20° C. in a glass beaker. 0.52 g of 4,4'-diaminodiphenylmethane was dissolved in 5.70 g of acetone in a second glass beaker. The two solutions from step (a) were mixed. This gave a clear, low-viscosity mixture. The mixture from (b) was cured at room temperature for 24 hours. The gel obtained in (c) was subsequently taken from the glass beaker and the liquid (acetone) was removed by drying at 20° C. for 7 days.

The material obtained had a pore volume of 4.2 ml/g and an average pore diameter of 2.2 μm. The porosity was 86% by volume with a corresponding density of 199 g/l.

The material obtained had a thermal conductivity λ of 36.2 mW/m*K at 26.6° C.

Example 2

0.76 g of Lupranat® M200R having an NCO content of 30.9 g per 100 g in accordance with ASTM D-5155-96 A, a functionality in the region of three and a viscosity of 2100 mPa·s at 25° C. in accordance with DIN 53018, was dissolved in 5.4 g of acetone while stirring at 20° C. in a glass beaker. 0.75 g of 4,4'-methylenebis(2-chloroaniline) was dissolved in 5.5 g of acetone in a second glass beaker. The two solutions from step (a) were mixed. This gave a clear, low-viscosity mixture in which 0.12 g of a foam of melamine-formaldehyde resin was immersed. The foam Basotect from BASF was used. The foam was cylindrical and was completely covered by the mixture. The mixture and the immersed foam were allowed to stand at room temperature for 24 hours to effect curing. The gel obtained in (c) was subsequently taken from the glass beaker and the liquid (acetone) was removed by drying at 20° C. for 7 days.

The material obtained had a porosity of 91% by volume with a corresponding density of 110 g/l.

The material obtained had a thermal conductivity λ of 32 mW/m*K at 26.6° C.

Example 2C 0.76 g of Lupranat® M200R having an NCO content of 30.9 g per 100 g in accordance with ASTM D-5155-96 A, a functionality in the region of three and a viscosity of 2100 mPa·s at 25° C. in accordance with DIN 53018, was dissolved in 5.4 g of acetone while stirring at 20° C. in a glass beaker. 0.75 g of 4,4'-methylenebis(2-chloroaniline) was dissolved in 5.5 g of acetone in a second glass beaker. The two solutions from step (a) were mixed. This gave a clear, low-viscosity mixture. The mixture from (b) was cured at room temperature for 24 hours. This did not result in formation of a gel but instead gave a precipitate. The liquid (acetone) was removed by drying at 20° C. for 7 days.

No thermal conductivity could be measured.

Example 3

1.13 g of Lupranat® M200R having an NCO content of 30.9 g per 100 g in accordance with ASTM D-5155-96 A, a functionality in the region of three and a viscosity of 2100 mPa·s at 25° C. in accordance with DIN 53018, were dissolved in 5.1 g of acetone while stirring at 20° C. in a glass beaker. 1.11 g of 4,4'-methylenebis(2-chloroaniline) were dissolved in 5.1 g of acetone in a second glass beaker. The two solutions from step (a) were mixed. This gave a clear, low-viscosity mixture in which 0.12 g of a foam of melamine-formaldehyde resin was immersed. The foam Basotect from BASF was used. The foam was cylindrical and was completely covered by the mixture. The mixture and the immersed foam were allowed to stand at room temperature for 24 hours to effect curing. The gel obtained in (c) was subsequently taken from the glass beaker and the liquid (acetone) was removed by drying at 20° C. for 7 days.

The material obtained had a porosity of 89% by volume with a corresponding density of 140 g/l.

The material obtained had a thermal conductivity λ of 34.9 mW/m*K at 26.6° C.

Example 3C 1.13 g of Lupranat® M200R having an NCO content of 30.9 g per 100 g in accordance with ASTM D-5155-96 A, a functionality in the region of three and a viscosity of 2100 mPa·s at 25° C. in accordance with DIN 53018, were dissolved in 5.1 g of acetone while stirring at 20° C. in a glass beaker. 1.11 g of 4,4'-methylenebis(2-chloroaniline) were dissolved in 5.1 g of acetone in a second glass beaker. The two solutions from step (a) were mixed. This gave a clear, low-viscosity mixture. The mixture from (b) was cured at room temperature for 24 hours. The gel obtained in (c) was subsequently taken from the glass beaker and the liquid (acetone) was removed by drying at 20° C. for 7 days.

The material obtained had a porosity of 85% by volume with a corresponding density of 200 g/l.

The material obtained had a thermal conductivity λ of 40.4 mW/m*K at 26.6° C.

The invention claimed is:

1. A process for producing a xerogel composite, comprising:
(a) preparing an organic gel precursor (A) comprising a polyfunctional isocyanate monomer component (A1) and a polyfunctional aliphatic amine monomer component (A2);
(b) reacting the polyfunctional isocyanate monomer component (A1) and the polyfunctional aliphatic amine monomer component (A2) in the presence of an open-celled macroporous foam (B) and a solvent (C) to obtain a xerogel composite; and
(c) drying the xerogel composite by conversion of the solvent (C) into the gaseous state at a temperature and a pressure below the critical temperature and the critical pressure of the solvent (C),
wherein a porosity of the xerogel is at least 70% by volume,
the xerogel composite is not brought into contact with an organic fluid after (b), and
the polyfunctional aliphatic amine is at least one selected from the group consisting of bis(2-aminoethyl)amine, tris(2-aminoethyl)amine, triethylenetetramine, tetramethylenediamine, ethylenediamine, a diamine of butane, a diamine of pentane, 2-methyl-1,5-diaminopentane, 1,6-diaminohexane, 1,7-diaminoheptane, 1,8-diaminooctane, 1,9-diaminononane, 1,10-diaminodecane, 1,12-diaminododecane, 1-amino-3-aminomethyl-3,5,5-trimethylcyclohexane, 4,4'-methylenebis (cyclohexylamine), 4,4'-diaminodicyclohexyl-1,2-propanediamine, 4,4'-diaminodicyclohexyl-1,3-propanediamine, 2,4'-diaminodicyclohexyl-1,2-propanediamine, 2,4'-diaminodicyclohexyl-1,3-propanediamine, 2,2'-diaminodicyclohexyl-1,2-propanediamine, 2,2'-diaminodicyclohexyl-1,3-propanediamine, 2-methyl-1,2-diaminopropane, 2,2-dimethyl-1,3-diaminopropane, bis(4-amino-3-methylcyclohexyl)methane, 1,2-diaminocyclohexane, 1,4-diaminocyclohexane, bis(1,3-methylamino)cyclohexane, a bishydrazide, a bissemicarbazide, N,N,N-tris(2-aminoethyl)amine, guanidine, N-(2-aminoethyl)-1,3-diaminopropane, tetraethylenepentamine, pentaethylenehexamine, diaminopropyleneethylenediamine, propylenediamine, hexamethylenediamine, diaminocyclohexane, triglycol diamine, 1,3-diaminopropan-2-ol, ω,ω'-diaminodi-n-hexylamine, dimethyl 1,4-diaminoadipate and a polyalkylenepolyamine.

2. The process according to claim 1, wherein the monomer component (A1) is at least one selected from the group consisting of diphenylmethane 2,2'-diisocyanate, diphenylmethane 2,4'-diisocyanate, diphenylmethane 4,4'-diisocyanate and oligomeric diphenylmethane diisocyanate.

3. The process according to claim 1, wherein the monomer component (A1) is an oligomeric diphenylmethane diisocyanate having a functionality of at least 2.5.

4. The process according to claim 1, wherein the components (A1) and (A2) each have a functionality of at least two and the sum of the functionality of component (A1) and the functionality of component (A2) is at least 4.5.

5. The process according to claim 1, wherein the open-celled macroporous foam (B) has a volume average pore size of from 20 to 1000 microns.

6. The process according to claim 1, wherein the open-celled macroporous foam (B) is based on reactive polycondensation resins.

7. The process according to claim 1, wherein the open-celled macroporous foam (B) is a melamine-formaldehyde foam.

8. A xerogel composite obtained by the process according to claim 1.

9. The process according to claim 1, wherein the porosity of the xerogel is from 70% to 99% by volume.

10. An insulating material, comprising the xerogel composite according to claim 8.

11. A thermal insulation, comprising the xerogel composite according to claim 8.

12. A vacuum insulation panel, comprising the xerogel composite according to claim 8.

13. A refrigeration unit or a building, comprising the xerogel composite according to claim 8.

* * * * *